Aug. 27, 1946.     R. B. IMMEL     2,406,378
VIBRATORY LATCHING DEVICE
Filed March 25, 1944     2 Sheets-Sheet 1

WITNESSES:

INVENTOR
Ralph B. Immel.
BY
Paul E. Friedemann
ATTORNEY

Aug. 27, 1946.  R. B. IMMEL  2,406,378
VIBRATORY LATCHING DEVICE
Filed March 25, 1944  2 Sheets-Sheet 2
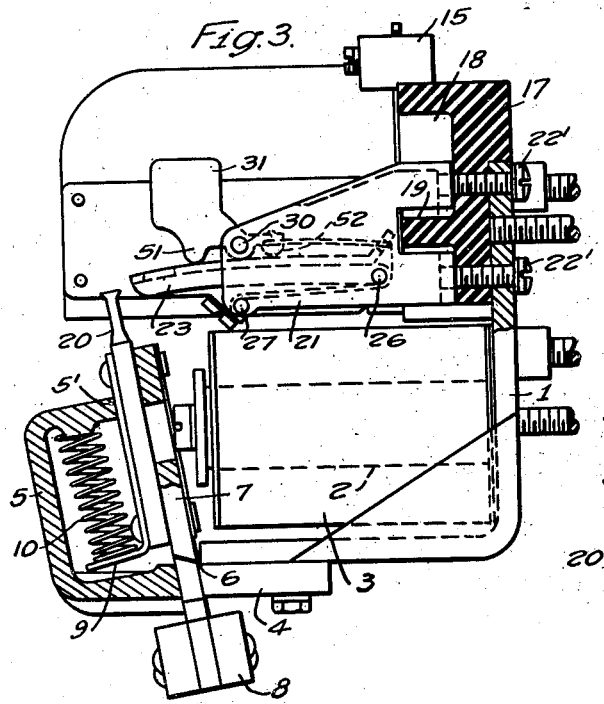
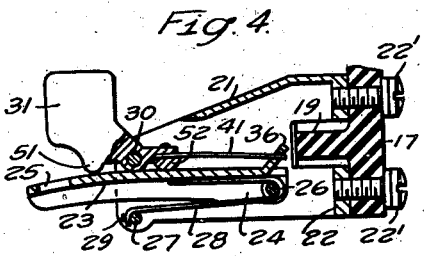
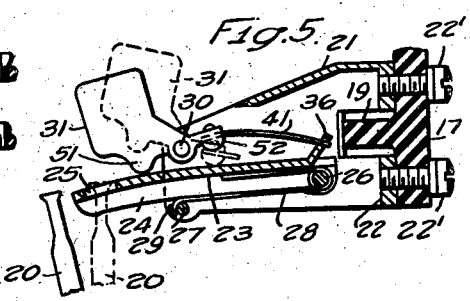
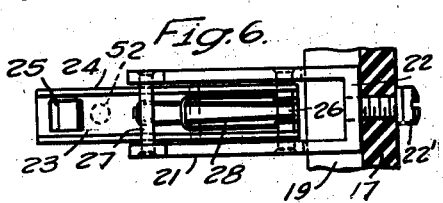
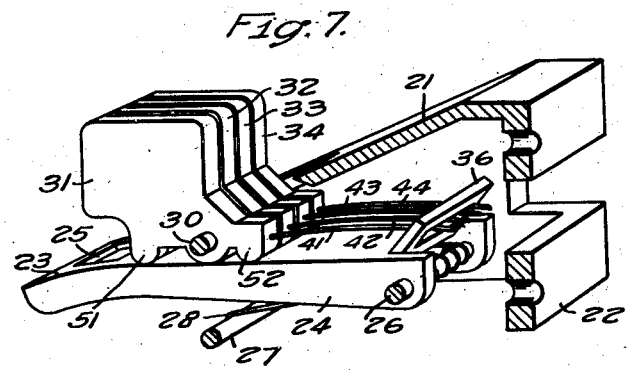
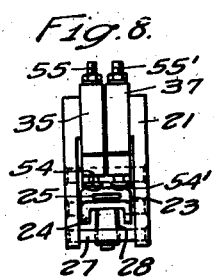
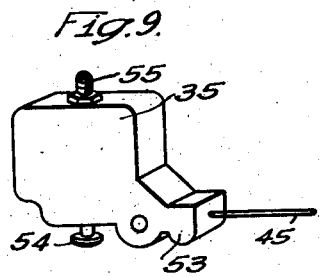
WITNESSES:
INVENTOR
Ralph B. Immel.
BY
Paul E. Friedemann
ATTORNEY Patented Aug. 27, 1946

2,406,378

UNITED STATES PATENT OFFICE 2,406,378

VIBRATORY LATCHING DEVICE

Ralph B. Immel, Wilkinsburg, Pa., assignor to Westinghouse Electric Corporation, East Pittsburgh, Pa., a corporation of Pennsylvania Application March 25, 1944, Serial No. 528,060

5 Claims. (Cl. 74—527)

1

My invention relates to shock-responsive latching devices for preventing failure or faulty operation of apparatus, especially electric contactors, under impact or shock conditions.

It has been proposed and undertaken to prevent electric relays and switches from uncontrolled operations when exposed to shock or vibrations by providing them with a latching device which, usually inoperative, is placed into latching condition by means of a mechanical vibratory system that responds more readily to shock than the apparatus to be protected and locks the apparatus in position as long as the shock of its vibratory effect persists.

A general object of my invention is to improve latching devices and shockproof apparatus of the type just mentioned so as to increase their range of response and render their adjustment less exacting than in the known devices.

The vibratory system in the known shock-responsive latching devices, usually composed of a movable weight and a spring, is rather critical as to the adjustment necessary for covering a satisfactory range of low and high impact forces. It may occur that a device which works satisfactorily on low impact forces responds to a lesser degree on high impact blows and vice versa, such a device may also be exposed to impacts of a frequency too different from the natural frequency of the weight and spring combination to be sufficiently within the range covered by the damped resonance characteristic of the latching device. Hence, it is a more specific object of the invention to provide a latching device that responds more safely to shock frequencies of widely different magnitudes.

Another object of my invention is to provide a shock responsive locking or latching device, in accordance with the foregoing object, that lends itself readily for application with different types of electrical apparatus and can be manufactured or tested as a separate latching unit.

In order to achieve these objects, a shock-responsive latching device according to the invention has a support or frame structure separably attached to the apparatus to be latched and serving as a holder for a normally inoperative latch as well as for a plurality of mechanical oscillatory systems of different oscillation characteristics which are arranged to operate and control the latch independently of one another so that any of the systems is capable of moving the latch into latching or locking position when responding to shock. In order to obtain the desired difference in oscillation characteristics, the mechanical oscillators may have different natural frequencies and/or different damping.

According to a preferred embodiment of my invention, I provide a device of the type just mentioned with a number of independently movable weights of substantially equal mass and dimensions and attach thereto a corresponding number of springs of different elasticity or stiffness so that the oscillators have different natural frequencies because of the different springs.

According to still another feature of the invention, the plurality of weights are all movably mounted for reducing motion about a common pivot axis so that their planes of motion are in parallel to one another, and each appertaining spring is a substantially straight rod or strand shaped body located substantially in parallel to the other springs and of similar over-all length so that the fastening points of the springs lie on a line in parallel to the just-mentioned pivot axis more specifically these springs are fastened to a portion of the latching lever located near the fulcrum of the lever.

These objects and features will be fully understood from the following description of the embodiments illustrated in the drawings.

Fig. 3 is another part-sectional side elevation seen from the same viewpoint as Fig. 2, the sectional parts of Fig. 3 being in the plane denoted by the dot-and-dash line III—III in Fig. 1.

Fig. 4 shows a sectional view of the latching device separate from the contactor with the latching lever in inoperative position.

Fig. 5 is an illustration similar to that of Fig. 4 but showing the latching device in operative condition;

Fig. 6 is a bottom view of the latching device according to Figs. 4 and 5;

Fig. 7 is a part-sectional and perspective view of the same device;

Fig. 8 represents a front view of a different embodiment of the latching device; and Fig. 9 is a perspective view of one of the mechanical oscillating systems of the device according to Fig. 8.

Figure 1:
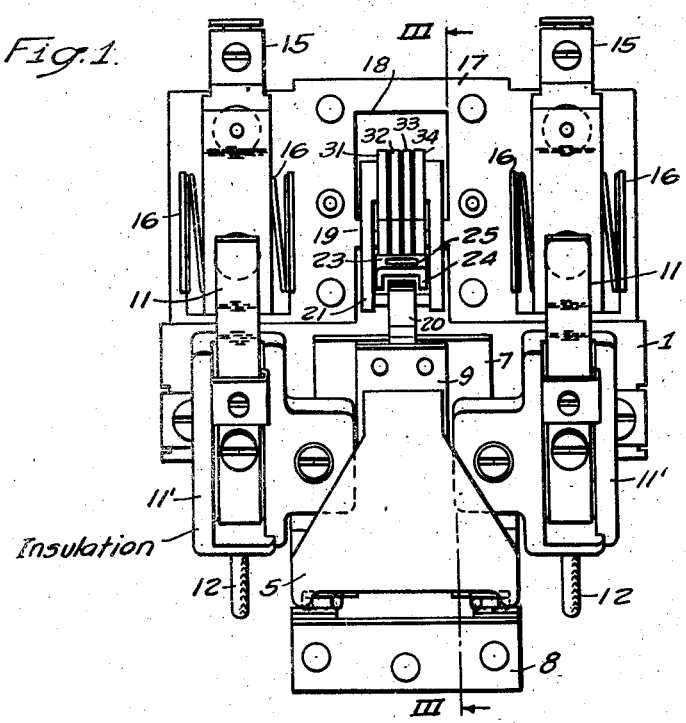
Figure 1 is a top view of a contactor provided with a shock responsive latching device according to my invention.
Figure 2:
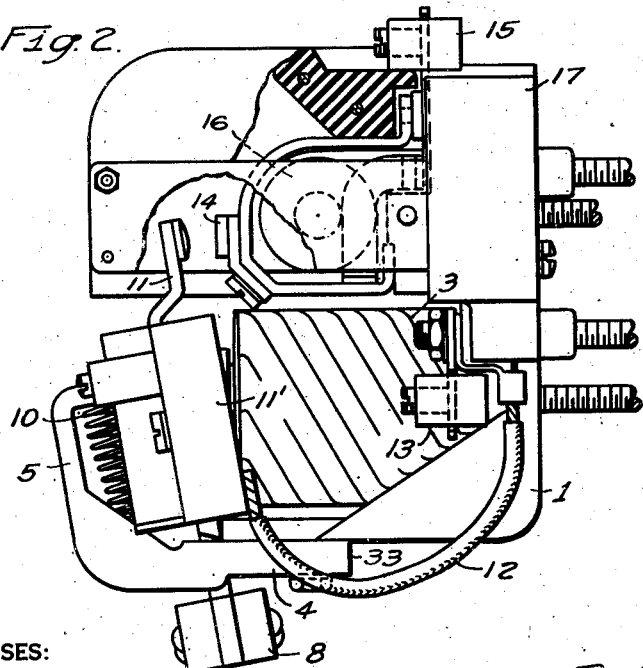
Fig. 2 is a part-sectional side elevation of the same contactor.

Referring to Figs. 1, 2, and 3, the illustrated contactor has a magnetic frame structure 1 which carries a magnet core 2 and a coil 3 placed around the core. An abutment member 4 is mounted on the magnetic structure 1 and has a bracket portion 5 which extends towards the area in front of the magnet core. The abutment member 4 and the adjacent end of the structure 1 form a corner at 6 which serves as a dihedral pivot bearing for the armature 7. The armature is beveled so as to form a knife-type edge which engages the pivot bearing. A weight 8 is firmly secured to the armature 7, and so is a bracket 9 which forms an abutment for a coiled compression spring whose other end is braced against an abutment formed by the portion 5 of the member 4. A latch member 20 is also rigidly secured to the armature for a purpose to be described hereinafter.

Two contact members 11 are mounted on an insulating carrier 11' secured to the armature 7 and are each connected by a flexible cable 12 with two terminals 13 respectively. Each contact 11 cooperates with one of two stationary contacts 14 which are provided with respective terminals 15. Blowout coils 16 serve to quench the interrupting arcs occurring between each pair of contacts 11 and 14 during the interrupting operation. The stationary contacts 14, their terminals 15, the blowout coils 16, and the terminals 13 of the movable contact 11 are mounted on a common base 17 molded of insulating material which is firmly secured to the magnetic structure 1. The base 17 has a recess or groove 18 in its center portion and a ridge 19 which traverses the recess in order to increase the mechanical strength of the molded body 17.

The armature assembly, including the armature proper and the elements 9, 20, 11' and 11 attached thereto, is so biased by the spring 10 that the pivot edge of the armature 7 is held against the dihedral pivot bearing at 6 (Fig. 3). In this manner, the armature assembly is constrained to perform angular movements about the axis of the pivot bearing towards and away from the magnet core. The force of spring 10 has also a component which biases the armature assembly away from the magnet core and towards a stationary stop formed at 5' (Fig. 3) by the portion 5 of the abutment member 4. When the armature rests against the stop, the movable contacts 11 are separated from the stationary contacts 14 (Fig. 2) so that the circuit between each pair of terminals 13 and 15 is opened. When the relay coil 3 is energized, the armature 7 is attracted by the magnet core 2 and moves its contacts 11 into circuit closing position.

In order to prevent the above described contactor from performing undesired operations when subjected to shock and vibration, especially as occurring on naval vessels due to the operation of their internal equipment or by contact with external objects, a latching device is provided. This latching device includes a substantially U-shaped support or frame structure 21 consisting, for instance, of a sturdy metal casting whose base portion 22 is mounted by means of screws 22' on the insulating base 17, the screws 22' serving also to attach the base 17 to the magnetic structure 1 of the contactor.

Referring to Figs. 4, 5, and 6, a channel-shaped latching lever 23 has its flange portions 24 fulcrumed about a pin 26 which is mounted between the two parallel legs of the support 21 and located relatively close to the base portion 22 of the structure. Another pin 27 secured between the legs of the support 21 at a place relatively remote from the base portion 22 has a projection 29 which serves as an abutment or holder for a wire spring 28. This spring is wound around the pin 26 and presses against the latching lever 23 so as to hold it in its inoperative position illustrated in Figs. 1, 3, and 4. The lever 23 has an opening at 25 for engagement with the latch 20 of the armature 7 (Fig. 3) when the armature is in contact closing position. A third pin 30 also secured between the two legs of the U-shaped structure 21 serves as a pivot for four weights denoted by 31, 32, 33 and 34. The pins 26, 27 and 30 are preferably riveted to the support 21 at one or both of their ends.

Each of the weights 31, 32, 33 and 34 is capable of oscillation independent of the other weights and has two projections such as those denoted by 51, 52 which face the lever 23 and serve to move the lever into latching position against the force of spring 28. Four wire springs 41, 42, 43 and 44 are at one end firmly secured to the weights 31, 32, 33, and 34, respectively. The other ends of the springs pass through an opening in an extension 36 of the latching lever 23.

The springs have the tendency to hold each weight in the inoperative position shown in Figs. 4 and 7. Each combination of weight and spring thus forms an oscillatory system which tends to vibrate in its natural frequency when the latching device and the apparatus on which it is mounted are subjected to shock. The springs 41 through 44 have different diameters and, consequently, different stiffness. As a result, the natural frequencies of the four oscillatory systems are different. These frequencies are so graduated that they cover the desired range within which the latching device is intended to be operative.

The operation of each oscillatory system will be understood from the following reference to Fig. 5 showing the weight 31 in two different positions, both occurring during an oscillation. One of these positions of weight 31 is shown in full lines while the other is represented in broken lines. During an oscillation, the projection 51 of the weight 31 will move towards the lever 23 and push it into the latching position. Upon reversal of its oscillatory motion, the weight 31 will move its projection 53 towards the lever 23, as shown in broken lines, again with the effect of moving the lever 23 into latching position. Consequently, as long as any of the four weights oscillates, the lever 23 will be held in the latching position.

Assuming that the contactor was in the contact-opening position shown in Fig. 3, the lever 23 when operative will prevent the latch 20 of the armature from moving towards the closing position. This is apparent from the full-line showing of latch 20 in Fig. 5.

Assuming that the contactor was in the contact closing position before the occurrence of shock, the latch 20 of the armature will assume the position shown in broken lines in Fig. 5. Consequently, the opening 25 of the latching lever 23 will engage the latch 20 and prevent it from leaving the contact closing position.

Since all four oscillatory systems operate the latching lever 23 in the manner just described, the latching device will be effective upon the occurrence of any shock or vibration condition capable of causing any of the four systems to oscillate.

In the embodiment represented by Figs. 8 and 9, only two oscillatory systems are provided while the latching device is otherwise designed in accordance with the above described embodiment. The contactor may also have the same construction as shown in the foregoing, although it will be understood that devices according to my invention can be used to advantage with other contactors or apparatus of any type in which a movable member is to be safeguarded against changes of position due to shock or vibration.

In the embodiment according to Figs. 8 and 9, the two oscillatory weights are denoted by 35 and 37. Each of these weights is connected with a wire spring, such as spring 45 shown in Fig. 9. These springs are in engagement with an extension of the latching lever similar to extension 36 in Figs. 4, 5, and 7. Weight 35 has two projections denoted by 53 and 54 for engaging the latching lever 23 in the manner described in conjunction with the foregoing embodiment. The projection 54, however, is secured to the weight 35 by means of a screw 55 which permtis adjusting the distance between the projection and the weight 35. The weight 37 has similar projections, one of them being denoted by 54' and provided with an adjusting screw 55'. The operation of this modified system is similar to the one discussed in the foregoing.

It will be apparent from the foregoing description that since the range of shock or vibration frequencies to be covered by the latching device is embraced by virtue of a multiplicity of oscillatory devices, the damping of each of these devices need not be as great as is necessary in the known vibration responsive devices with only one oscillatory system. The reduction in damping thus afforded with respect to each individual oscillating system has the effect of increasing the sensitivity of response to my device, and hence represents a considerable functional improvement over the known latching apparatus of the vibratory type. As a result, my improved device responds more readily to high and low impact forces and does not require a special adjustment of its individual oscillating system as regards the determinants of the oscillation characteristics.

Latching devices according to my invention form a unit separate from the contactor or other apparatus to be protected. Due to this fact, the latching devices can be separably manufactured and assembled and are applicable in connection with electric devices of different design and type, it being only necessary to provide the movable member or armature of the device with a latch corresponding to part 29 in the above-described embodiment.

I am aware of the fact that latching devices according to my invention may be modified in various ways without departing from the objects and essential features of my invention. Therefore, I intend the foregoing description to be understood as illustrative and not in a limiting sense.

I claim as my invention:

1. A device for latching a movable member in response to the occurrence of shock, comprising, in combination, a support, two pivot shafts mounted on said support in parallel to each other, a latching lever mounted on one of said shafts for angular motion and extending in the general direction towards and beyond said other shaft, a plurality of weights mounted for individual angular motion on said other shaft and having each two projections at opposite sides of said latter shaft for engaging said lever in order to move it into latching position upon oscillation of any of said weights, a corresponding plurality of strand-shaped springs having one end attached to one of said weights respectively, said lever having a projection located near said first shaft and extending away from said shaft at the side of said weights, and said springs having their respective other ends engaged by said projection, said weights and appertaining springs forming inertia controlled oscillatory systems of different natural frequencies.

2. A device for latching a movable member in response to the occurrence of shock, comprising a support, a latching lever fulcrumed on said support for pivotal motion between a latching position and an unlatching position, a spring disposed between said support and said lever to bias the latter towards inoperative position, a pivot shaft secured to said support, a plurality of oscillatory systems of different natural frequency having a plurality of respective weights fulcrumed on said pivot shaft in parallel to one another so that each is capable of independent oscillation for moving said latch means into latching position, and a plurality of straight strand-shaped springs attached to said weights respectively and extending substantially in parallel to one another.

3. A device for latching a movable member in response to the occurrence of shock, comprising movable latching means normally maintaining an unlatched position, and a plurality of mechanical oscillators of different oscillation characteristics arranged for individually controlling said latching means to move into a latching position upon occurrence of shock, each of said oscillators including a movable weight and a substantially straight piece of spring wire, said wires having substantially the same length and different stiffness to provide for different natural frequencies of said oscillators.

4. A device for latching a movable member in response to the occurrence of shock, comprising, in combination, a support, a lever pivoted on said support and forming a latch at its end remote from its pivot axis, said lever being biased to normally assume an unlatched position, a plurality of weights pivotally mounted on said support for individually engaging said lever between said end and said pivot axis, and a plurality of springs having one end attached to said weights respectively and the other end in engagement with said lever at a point near said pivot axis, said weights and respective springs forming inertia controlled oscillatory systems of different natural frequencies.

5. A device for latching a movable member in response to shock, comprising a support, a latch lever pivoted to said support for motion between a latching position and an unlatching position and being normally biased toward said unlatching position, said lever having an end portion remote from its pivot axis arranged relative to said member so as to prevent movement of said member when said lever is in said latching position, an inertia weight pivoted to said structure about an axis extending in parallel to the pivot axis of said lever and arranged adjacent to said lever substantially between said latter pivot axis and said end portion so that said weight, when oscillating due to shock, causes said lever to move into said latching position, and an elongated spring having one end attached to said weight and having the other end in engagement with said lever near said pivot axis of said lever.

RALPH B. IMMEL.